Aug. 11, 1964   J. E. BREKKE   3,143,884
SAMPLING DEVICE
Filed Jan. 30, 1962
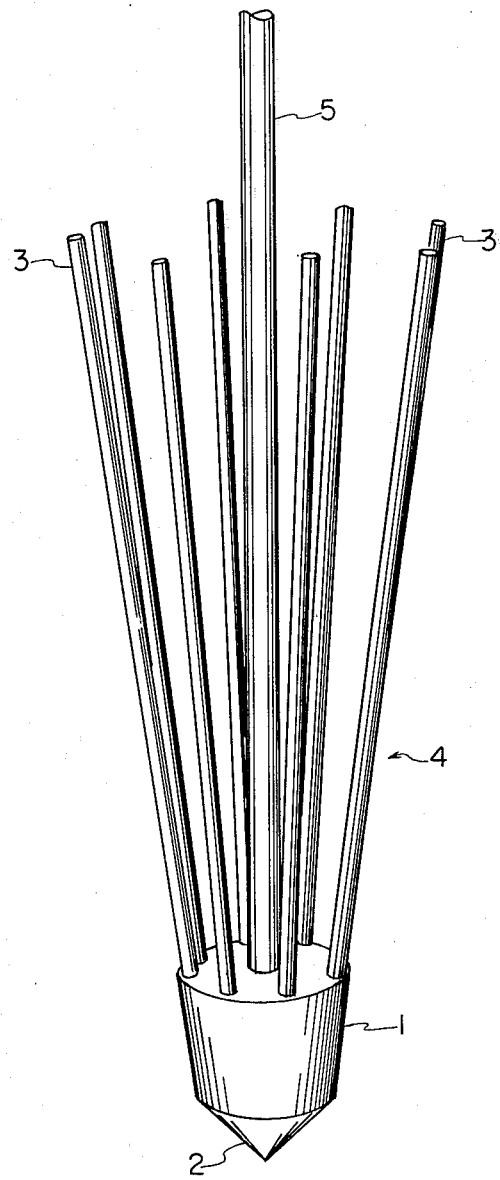
JOHN E. BREKKE
INVENTOR
BY R. Hoffman
ATTORNEY 3,143,884
SAMPLING DEVICE
John E. Brekke, Berkeley, Calif., assignor to the United States of America as represented by the Secretary of Agriculture
Filed Jan. 30, 1962, Ser. No. 169,980
2 Claims. (Cl. 73—425.2)
(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has as its primary object the provision of a novel device for collecting samples of material. Further objects of the invention will be obvious from the following description taken in connection with the annexed drawing wherein the single figure is a perspective representation of the sampling device of the invention.

In the processing of such commodities as olives, cherries, cucumbers, onions, tomatoes, peppers, etc., it is customary to hold the commodity in large tanks containing a brine or other liquid appropriate to the type of processing being applied. During such holding period it is necessary at intervals to withdraw samples of the commodity to determine such properties as color, texture, density, chemical composition, etc., whereby to gauge the progress of the treatment. In industrial operations the processing is generally conducted in large tanks having a capacity on the order of 10,000 gallons or more. With such large masses of material, adequate sampling is not possible with customary devices. Generally, it is a simple matter to obtain samples near the surface of the tank with a ladle or the like but it is impossible to withdraw representative samples from locations deep within the mass. It is of course obvious that local conditions in different parts of the tank may vary and for optimum results it is essential to conduct tests on samples from different points within the mass.

A principal object of the invention is the provision of a device adapted for obtaining samples from any desired location within a large mass of individual units of a commodity.

The construction and operation of the device of the invention will be evident from the following description.

Referring to the annexed drawing, the device includes a hub 1 of generally-conical shape tapering to a blunt point 2 at its lower end.

A series of eight rods 3 of equal length are spaced equidistantly about the axis of hub 1 and extend upwardly and outwardly. Each rod 3 is fastened to the top of hub 1 in conventional manner as by providing the rods with threaded ends which are screwed into complementary threaded holes bored into hub 1. It is evident from the drawing that hub 1 and rods 3, taken in the aggregate, define an upwardly-flaring, conical, open basket generally designated as 4.

For manipulating the device there is provided an elongated handle 5. This is attached to hub 1 in conventional manner, for example, by providing it with a threaded end which is screwed into a complementary threaded bore which extends into the hub at the axis thereof.

In operation of the device, the operator grasps handle 5 and lowers the basket 4 into the mass of material. The basket is lowered into the material until it reaches the level at which a sample is to be taken. Then the device is withdrawn and the units gathered within the basket are removed. Because of the flaring arrangement of rods 3, essentially none of the units are gathered within the device as it is lowered into the mass. During such downward movement the units are pushed outwardly (radially of the axis of the hub 1). When, however, the downward motion ceases and the upward motion is commenced, the rod 3 engage the units and propel them inwardly so that they become trapped within the basket-like arrangement of rods 3 and hub 1.

Contributing to the effectiveness of the device is the fact that hub 1 and rods 3 in the aggregate have a conical shape whereby the device can be lowered readily into deep masses with minimum disturbance of the location of individual units and without damage to individual units. Another significant item in this regard is the fact that rods 3 are free-standing, that is, there is no connection between them other than where they are joined, hub 1. Because of this construction even though the rods flare out from the axis they can slip readily downwardly through a mass of cherries, or the like, without causing any damage or significant displacement of the fruit.

The fact that rods 3 are free-standing and lack any cross connection therebetween (except at the base of the device) contributes markedly to the successful operation of the device with materials such as brined cherries which conventionally include a brine, cherries still retaining their stems, leaves, and even bits of twigs. With conventional cup-like sampling devices such as ladles or long-handled strainers, ineffective sampling is attained because of the tendency of the material to bridge across the opening of the cup. Thus when the conventional device is lowered into the mass and then upward motion is commenced, the material forms a bridge over the opening because of the entangling tendency of the curly stems, leaves, etc. As upward motion is continued the mat of entangled material tends to slough to one side or another, being replaced by a mat formed at a hgher elevation in the mass. When the sampling device is eventually raised out of the mass, one has no way of knowing from what level was derived the mat of entangled material which finally bridges the opening of the device. With the device of the invention this bridging and sloughing effect does not occur because filling of the basket 4 takes place as upward motion is commenced and the contents of the basket does not change as this motion is continued. Thus when the device of the invention is lowered into the mass of brined cherries and then upward motion is commenced, the individual rods 3 act as prongs, inserting themselves between matted structures and continued upward movement causes these structures to be firmly lodged within the central cavity between the rods. This collected material remains in place as upward motion is further continued so that the material thus brought out of the mass is representative of the material at the level at which upward motion was commenced.

It is, of course, obvious that the proportions of the device will vary with different applications thereof. For example, with larger units such as cucumbers, rods 3 will be spaced further apart than with smaller units such as olives or cherries. Usually the spacing of rods 3 is so adjusted that the minimum space between individual rods (at the top of hub 1) is somewhat smaller than the size of the average unit in the mass. In sampling brined cherries for example, excellent results are obtained with the rods spaced apart (at the top of hub 1) a distance of somewhat less than ½ inch, for example, 0.45 inch. The length of rods 3 may be varied depending on how large a sample is to be collected. Thus, in general, the longer the rods 3 the larger will be the sample collected. In sampling brined cherries a convenient length for rods 3 is about 4 to 8 inches. Handle 5 is proportioned to the type of vessel which contains the material to be sampled. Thus, a handle of sufficient length is provided so that the device can be inserted into any desired part of a tank of given dimensions.

It is preferred to fabricate the sampling device of stainless steel so that it will be able to withstand the corrosive effects of the liquid media with which it comes in contact.

Having thus described the invention, what is claimed is:

1. A sampling instrument adapted for withdrawing a sample from a mass of objects generally of a given size, comprising, in combination, a hub tapering to a point at its lower end, a series of blunt-tipped, freestanding rods joined to said hub and spaced uniformly about the axis of the hub, said rods extending upwardly and outwardly from the top of said hub, the minimum space between individual rods being correlated with the size of said objects, said rods and hub defining an upwardly-flaring, conical, open basket, and an elongated handle fastened to the top of said hub.

2. A sampling instrument adapted for withdrawing a sample from a mass of brined cherries including a brine, cherries still retaining their stems, leaves, and bits of twigs, comprising, in combination, a hub tapering to a point at its lower end, a series of blunt-tipped freestanding rods joined to said hub and spaced uniformly about the axis of the hub, said rods extending upwardly and outwardly from the top of said hub, the minimum space between individual rods being less than the average diameter of the cherries in the mass, said rods and hub defining an upwardly-flaring, conical, open basket adapted to entrap a sample of cherries as it is withdrawn from said mass, and an elongated handle fastened to the top of said hub.

References Cited in the file of this patent

UNITED STATES PATENTS 637,169     Slotterbeck _____ Nov. 14, 1899